United States Patent
Adamo et al.

(10) Patent No.: US 8,174,419 B2
(45) Date of Patent: May 8, 2012

(54) ANALOG-DIGITAL CONVERTER AND CORRESPONDING SYSTEM AND METHOD

(75) Inventors: Santi Carlo Adamo, Catania (IT); Vincent Onde, Rousset (FR); Francesco Bombaci, Messina (IT); Orazio Musumeci, Gela (IT)

(73) Assignees: STMicroelectronics S.r.l., Agrate Brianza (IT); STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 12/719,424

(22) Filed: Mar. 8, 2010

(65) Prior Publication Data
US 2010/0245148 A1 Sep. 30, 2010

(30) Foreign Application Priority Data
Mar. 31, 2009 (IT) .......................... TO2009A000244

(51) Int. Cl.
*H03M 1/00* (2006.01)
(52) U.S. Cl. ......... 341/141; 341/142; 341/155; 341/161
(58) Field of Classification Search .................. 341/141, 341/142, 155, 161
See application file for complete search history.

(56) References Cited

U.S. PATENT DOCUMENTS

| | | | |
|---|---|---|---|
| 6,486,809 B1 * | 11/2002 | Figoli | 341/141 |
| 6,697,006 B1 * | 2/2004 | McCartney et al. | 341/155 |
| 7,126,515 B1 * | 10/2006 | Kris | 341/141 |
| 7,135,998 B2 * | 11/2006 | Fey et al. | 341/118 |
| 7,235,999 B2 * | 6/2007 | Goetting et al. | 326/9 |
| 7,532,136 B2 * | 5/2009 | McMahon et al. | 341/141 |
| 7,616,140 B2 * | 11/2009 | Ishizawa | 341/141 |
| 7,663,520 B2 * | 2/2010 | Sugihara et al. | 341/141 |
| 7,667,631 B1 * | 2/2010 | Zhu | 341/141 |
| 7,852,246 B2 * | 12/2010 | Yang et al. | 341/141 |
| 7,916,053 B2 * | 3/2011 | Stanley et al. | 341/123 |
| 2008/0204289 A1 * | 8/2008 | Miettinen | 341/141 |
| 2008/0297384 A1 * | 12/2008 | McMahon et al. | 341/141 |
| 2008/0313357 A1 | 12/2008 | Wang et al. | |

OTHER PUBLICATIONS

Italian Patent Appl. No. TO20090244, Written Opinion; Oct. 8, 2009, pp. 1-7.

* cited by examiner

*Primary Examiner* — Linh Nguyen
(74) *Attorney, Agent, or Firm* — Hogan Lovells US LLP

(57) ABSTRACT

An analog-digital converter for converting an analog signal into a digital signal includes a first configuration register for configuring a first group of channels and a second configuration register for configuring a second group of channels. The conversion result of the channels of the first group is transferred to a memory via a direct memory access. Each channel of the second group of channels has an associated respective data register and the conversion results of the channels of the second group are stored in the respective data registers.

20 Claims, 4 Drawing Sheets

0x38h (ADC_JSQR)

| - | - | - | - | - | - | - | - |
|---|---|---|---|---|---|---|---|
| - | - | JL1 | JL0 | JSQ C3[4:1] ||||
| JSQ C3[0] | JSQ C2[4:0] |||| JSQ C1[4:3] |||
| JSQ C1[2:0] ||| JSQ C0[4:0] |||||

*Fig. 1* a) 0x2Ch (ADC_RSQR1)

| - | - | - | - | - | - | - | - |
|---|---|---|---|---|---|---|---|
| RL3 | RL2 | RL1 | RL0 | RSQ C15[4:1] ||||
| RSQ C15[0] | RSQ C14[4:0] |||| RSQ C13[4:3] |||
| RSQ C13[2:0] ||| RSQ C12[4:0] ||||| b) 0x30h (ADC_RSQR2)

| - | - | RSQ C11[4:0] | RSQ C10[4] |
|---|---|---|---|
| RSQ C10[3:0] || RSQ C9[4:1] ||
| RSQ C9[0] | RSQ C8[4:0] | | RSQ C7[4:3] |
| RSQ C7[2:0] || RSQ C6[4:0] || c) 0x34h (ADC_RSQR3)

| | | RSQ C5[4:0] | RSQ C4[4] |
|---|---|---|---|
| RSQ C4[3:0] || RSQ C3[4:1] ||
| RSQ C3[0] | RSQ C2[4:0] | | RSQ C1[4:3] |
| RSQ C1[2:0] || RSQ C0[4:0] ||

*Fig. 2*

ANALOG-DIGITAL CONVERTER AND CORRESPONDING SYSTEM AND METHOD

RELATED APPLICATION

The present application claims priority of Italian Patent Application No. TO2009A000244 filed 31 Mar. 2009, which is incorporated herein in its entirety by this reference.

FIELD OF THE INVENTION

The disclosure refers to analog-digital converters. The disclosure was devised with particular attention paid to its possible use in high speed analog-digital converters.

DESCRIPTION OF THE RELATED ART

Known in the prior art are various solutions for analog-digital converters (ADC) which transmit conversion results directly into a memory, for example of a microprocessor, through Direct Memory Access (DMA). Such converters allow optimization of the use of the silicon area, given that one single data register, for example on 12 bits, is required to temporarily save the results of the conversion before transferring the same to the memory.

SUMMARY OF THE INVENTION

The inventors observed that DMA transfers as described above may be slow and may even stop operation of the CPU and thereby reduce system performance. This behaviour is particularly disadvantageous, for example, if a continuous-conversion high-speed ADC converter is used for monitoring slow changing variables. Thus, an object of the present invention is providing an analog-digital converter capable of overcoming such drawbacks.

According to the invention, the object is achieved by means of a device having the characteristics referred to in the claims that follow. The invention also regards a corresponding system as well as a corresponding method. The claims form an integral part of the technical disclosure provided herein in relation to the invention.

In an embodiment, the analog-digital converter supports an operating method wherein the DMA access may be disabled and the results of the conversion are saved only in local registers, such as for example data registers normally used for temporarily saving instantaneous measurements. This also allows an efficient use of the data registers and the maintenance of the entire bandwidth of the bus, in particular when configured to perform continuous conversions.

In an embodiment, each conversion channel is assigned to at least one group of channels.

In an embodiment, conversion results of one first group, identified as a regular group, are temporarily saved in a single local register and subsequently transferred to a memory, for example a microprocessor RAM memory, through a DMA access.

In an embodiment, each conversion result of a second group, identified as an injected group, is saved in a respective register.

BRIEF DESCRIPTION OF THE DRAWINGS

The invention will now be described, purely for exemplary and non-limiting purposes, with reference to the attached representations, wherein:

FIGS. 1, 2a, 2b and 2c show an embodiment of the configuration registers of an ADC.

DETAILED DESCRIPTION OF PREFERRED EMBODIMENTS

Figure 3:
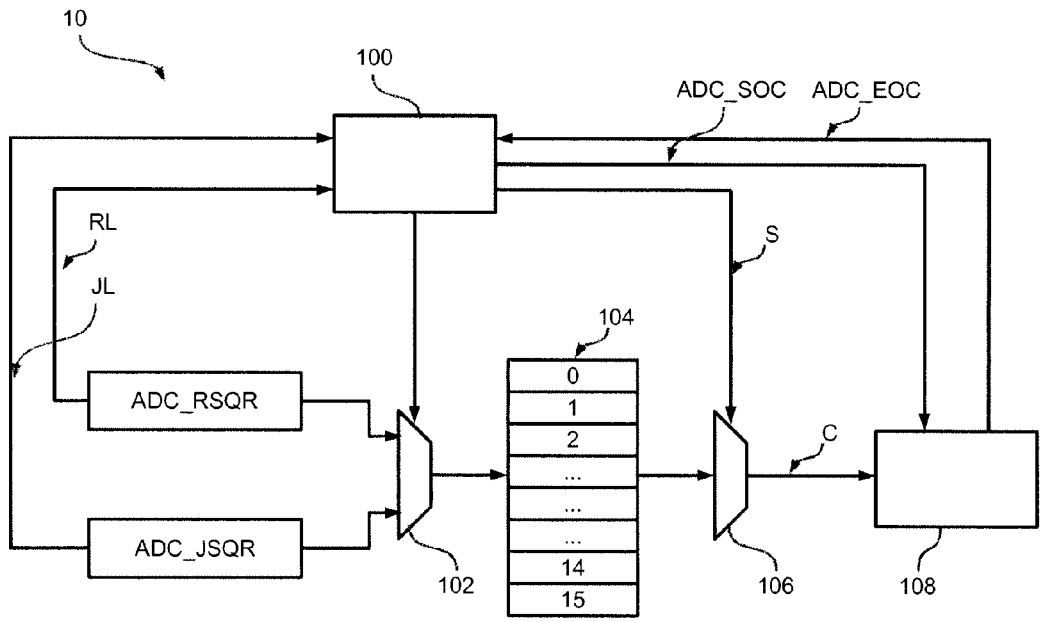
FIG. 3 is a block diagram of a possible embodiment of an ADC.

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader and thus they do not define the scope of protection or the range of the embodiments.

Considered in the following description, purely for exemplification purposes, is a 19-channel ADC.

In the embodiment considered, associated to the ADC is a plurality of configuration registers for defining at least two groups of channels: regular and injected.

The results of the conversion of the regular group are temporarily saved in a single local register and subsequently transferred to a memory through a DMA access, while the result of each conversion of the injected group is saved in a respective data register.

In the embodiment considered, two registers, ADC_RSQR and ADC_JSQR, are used to respectively specify the group of regular and injected channels.

In an embodiment, the ADC_JSQR register is a register comprising at least (5×4)+2 bits. The ADC_JSQR register allows for specification of a 4-channel arbitrary sequence (each, e.g., encoded in a binary form with 5 bits) among the 19 channels available. The 2 remaining bits (e.g., the most significant bits) of the ADC_JSQR register are used to define the number of channels to be converted. This means that the ADC is capable of converting up to 4 channels for the injected group and thus there are also 4 data registers for the results of the channel conversions of the injected group.

In an embodiment, the ADC_RSQR register is a register that comprises at least (5×16)+4 bits for specifying a 16-channel arbitrary sequence among the 19 channels available. In an analogous manner, the remaining 4 bits (e.g., the most significant bits) of the ADC_RQR register are used to define the number of channels to be converted. This means that the ADC is capable of converting up to 16 channels for the regular group, wherein the results of the channel conversions of the regular group are saved only temporarily in a single data register before being transferred to a memory through a DMA access.

In an embodiment, instead of using the number of dedicated bits for specifying the number of channels to be converted, a reserved channel number (e.g., a "00000" or "11111" bit sequence) is used for specifying the number of channels unused in the channel sequence.

In an embodiment, the ADC is associated to a microprocessor and the configuration registers are accessible through respective registers. In particular, if the length of a configuration register exceeds the width of the bus (e.g., 32 bits), the configuration register is divided into several "virtual" configuration registers each accessible through a respective address. In this manner, the microprocessor or a program executed thereby may directly access (i.e., read or encode) the content of the configuration registers.

FIG. 1 shows an example of the mapping for the 22 bits of the ADC_JSQR register accessible through the "0x38h" address. In particular, an identifier JL (bit [21:20]) defines the number of channels for the injected group and the identifiers JSQ_C0 . . . JSQ_C3 (bit [19:0]) define the channel sequence for the injected group.

For example, if the 22 bits of the ADC_JSQR register have the following content:

ADC_JSQR(21:0)=10 00011 00011 00111 00010 the ADC converts three channels for the injected group (i.e. the "10" bits sequence sets the length of the sequence to three) and the converted channels are channels 2, 7 and 3.

FIGS. 2a, 2b and 2c show a mapping example for the 84 bits of the ADC_RSQR register. In particular, three 32-bit virtual registers named ADC_RSQR1, ADC_RSQR2 and ADC_RSQR3 are used, wherein said three virtual registers are attained respectively through addresses "0x2Ch", "0x30h" and "0x34h".

In the embodiment considered, in order to specify the number of channels to be converted for the regular group an RL identifier (i.e. the bits [23:20] of the ADC_RSQR1 register) is used. Identifiers RSQ_C0 . . . RSQ_C15 (i.e. bits [19:0] of the ADC_RSQR1 register, bits [29:0] of the ADC_RSQR2 register and bits [29:0] of the ADC_RSQR3 register) define the sequence of the channels of the regular group.

For example, if the 84 bits of the ADC_RSQR register have the following contents:

ADC_RSQR(83:0)=0001 . . . 00011 00011 00111 00010 the ADC converts two channels (i.e., the sequence of "0001" bits sets the length of the sequence to two) and the converted channels are channels 2 and 7.

The conversion of the channels in the injected group usually starts after a triggering event, for example an external trigger, and the conversion may send an interrupt towards the conversion of the sequence of channels in the regular group.

In an embodiment, the ADC also supports a mode of operation wherein the conversion of the channels in the injected group is activated automatically when the conversion of the channels in the regular group terminates, thus avoiding requiring a special external triggering event. For example, this allows converting all the 19 channels of the converter with a single triggering event by suitably setting the ADC_RSQR and ADC_JSQR configuration registers.

FIG. 3 is a block diagram of a possible embodiment of such converter 10 which supports the automatic activation of the channel conversion in the injected group.

In the embodiment considered, the conversion of the regular group is activated through a setting of a bit in a configuration register. For example, this bit may be set upon request (e.g., by an external trigger or a microprocessor.)

At the end of the conversion of the channels in the regular group, if a respective bit in a configuration register indicates that the automatic conversion is activated (for example when the JAUTO bit is set to '1'), the conversion of the channels in the injected group is activated.

In the embodiment considered, the conversion of the groups of channels is controlled through a control module, for example a Finite-State Machine (FSM) 100 provided in the converter 10 by a digital circuit.

At the beginning, the FSM 100 actuates a multiplexer 102 to select the regular group and the entire sequence of channels in the regular group, as defined in the ADC_RSQR register, is loaded into a buffer 104.

The FSM 100 actuates a second multiplexer 106 through a channel selector S, in such a manner to select the first element in the buffer 104 (i.e., the first normal channel). For example, in the embodiment considered, the multiplexer 106 provides the number of the channel currently selected C encoded in binary form with 5 bits.

Subsequently, the FSM 100 activates the conversion by means of an activation signal ADC_SOC sent to a conversion module 108. The conversion module 108 converts the channel currently selected C and generates a signal ADC_EOC at the end of the conversion.

The FSM 100 receives the ADC_EOC signal and if other channels in the regular group need to be converted, increases the channel selector S to select the next channel of the regular group through the multiplexer 106. The FSM 100 increases the channel selector S until value RL (i.e., bits [23:20] of the ADC_RSQR1 register) is reached, i.e. the length of the sequence of the regular group.

For example, for the previous exemplifying sequence regarding the ADC_RSQR register, the signal of the channels C would first provide value "0x2h" and then value "0x7h".

Subsequently, the FSM 100 selects—through the multiplexer 102—the ADC_JSQR register and the entire sequence of channels in the injected group, as defined in the ADC_JSQR register, is loaded into the buffer 104. In a manner substantially similar to the case of the regular group, the FSM 100 actuates the multiplexer 106 to select the channels in the buffer 104 and the respective channels of the injected group are converted by the ADC until the JL value (i.e., the bits [21:20] of the ADC_JSQR register) is attained, i.e., the length of the sequence of the injected group.

In the embodiment considered, the buffer 104 comprises 16 positions with 5 bits, thus allowing storing the sequence of the regular group or the sequence of the injected group. However, even a larger buffer could be used, for example a buffer with 20 positions, in such a manner to directly store both the sequence of the regular group the sequence of the injected group.

For example, the use of the buffer 104 allows the user to change the value of the ADC_RSQR and ADC_JSQR registers during conversion; these values are loaded into the buffer 104 only when the current conversion ends. The use of the buffer 104 may also allow minimizing the combining path towards the conversion module 108.

Figure 4:
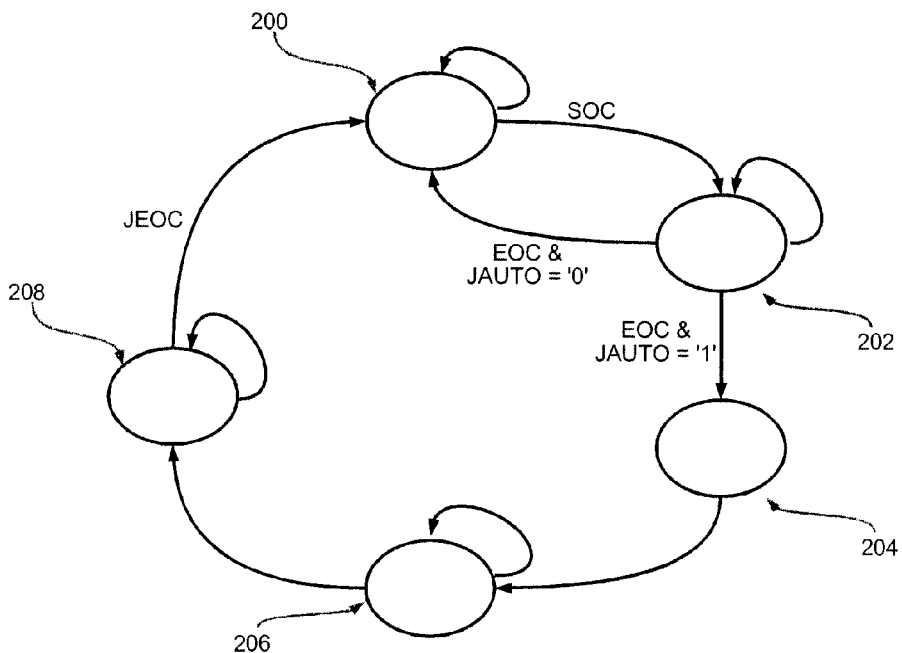
FIG. 4 is a state diagram of a possible control scheme of the ADC of FIG. 3, and FIGS. 5-7 show an example of an application of the ADC shown in FIG. 3.

FIG. 4 shows a state diagram of an embodiment of the FSM 100.

The FSM is initialised (e.g., by means of a reset) in an initial state 200. When the conversion of the channels is activated (e.g., through a start of conversion signal SOC), the FSM passes from the initial state 200 to a state 202, in which the conversion of the channels of the regular group is activated. In particular, in condition 202, the sequence of the normal channels is saved in the buffer 104 and conversion of the first normal channel is activated, e.g., by activating the start of conversion signal ADC_SOC.

The conversion module 108 receives the ADC_SOC signal, converts the channel currently selected C and activates an end of conversion signal ADC_EOC at the end of each conversion. The ADC_EOC signal allows the FSM to increase the channel selector S for the multiplexer 106 in such a manner to indicate the subsequent position in the buffer 104. Hence, the channel currently selected C acquires the value of the next channel and a new conversion is started, for example by activating the start of conversion signal ADC_SOC again.

At the end of the conversion of all channels in the regular group, an end of conversion signal EOC of the regular group is generated (and preferably saved in a configuration register).

If the automatic conversion is activated (e.g., the JAUTO bit is set to '1'), the FSM evolves towards a state 204 in which the injected group is selected, through the multiplexer 102. In particular, in condition 204, the sequence of injected channels is saved in the buffer 104 and the FSM evolves towards a state 206.

Otherwise (e.g., the JAUTO bit is set to '0'), the FSM returns to the initial state 200.

In state 206 the conversion of the channels in the injected group is carried out (which occurs in a manner substantially similar to the conversion of the regular group) until the length of the sequence of the injected group (i.e. the bits [21:20] of the ADC_JSQR register) is attained.

After activating the conversion of the last channel of the injected group, the FSM evolves towards a standby state 208 awaiting for the arrival of the end of conversion signal ADC_EOC regarding the conversion of the last channel of the injected group. Lastly, an end of conversion signal of the channels of the injected group JEOC is generated (and preferably saved in a configuration register); the FSM returns to the initial state 200.

Figure 5:
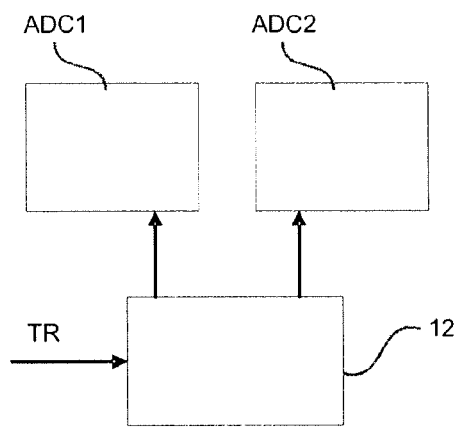

FIG. 5 shows an application example wherein the previously described analog-digital converter may be applied.

In particular, FIG. 5 shows an embodiment of a System-on-Chip (SoC) containing two converters—ADC1 and ADC2—with each converter having the architecture illustrated in FIG. 3, and a synchronization module 12, which receives a trigger signal TR.

For example, such systems may be used in a motor drive scheme such to require the detection of electrical currents: for example in the case of field oriented control or three-phase brushless motor control.

Also by way of example, two ADC converters are synchronised in such a manner to gather simultaneous samples of two independent signals such as two of the three currents in the three-phase motor windings.

Some systems may also measure all the three three-phase motor currents through a single shunt resistor, reducing the cost of the system. In this case, an analog signal may be measured twice at very precise moments, synchronised for example with a PWM generator.

Furthermore, there are situations wherein it is not possible to reconstruct the current, for example when the sample measurement window is too short (which may occur when the measurement time of the single ADC exceeds the sampling period). However, the shorter the interval between two subsequent conversions, the shorter the "blind" window and the current may be reconstructed in a precise manner.

In this general framework, a synchronization mechanism may be provided to trigger at least two conversions without limitation on any temporary interval with a single trigger signal TR.

In the embodiment considered, the synchronization module 12 receives an external trigger TR as input. Subsequently, the module 12 alternatively activates the conversion of one of the two converters ADC1 and ADC2.

In this context, the present ADC allows for:
conversion to be a conversion of a single channel or a sequence of channels, and a user to decide according to the application requirements whether the conversion should be carried out with:
  a) a regular group, wherein the results are transferred to a memory (e.g., the memory of a microprocessor) by means of a DMA access,
  b) an injected group, wherein the results are saved in respective local registers, or
  c) both, in the case of an activation of the conversion of the injected group in an automatic manner after the conversion of the regular group.

Regarding synchronization module 12, too frequent trigger signals may cause the loss of one of the alternating conversions. In order to avoid this problem, the module 12 may receive the external trigger TR as input and the information regarding the occupation and/or availability of each ADC, for example by means of a state signal.

For example, in the embodiment considered, the module 12 receives an availability signal ADC1_idle for converter ADC1 (for example having the logic level '1' no conversion is carried out) and an availability signal ADC2 idle for converter ADC2. For example, such signal may be generated by means of the previous ADC_EOC signals (for each single conversion), EOC (for the regular group) or JEOC (for the injected group).

In the embodiment considered, the module 12 thus generates the respective start of conversion signals SOC for converters ADC1 and ADC2.

Figure 6:
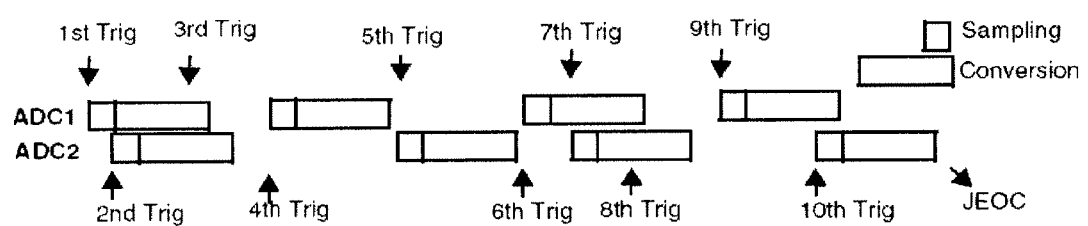

FIG. 6 shows an example of a possible external trigger TR sequence and a respective (desirable) alternating activation of converters ADC1 and ADC2.

FIG. 6 shows a sequence of 10 trigger events (i.e., "1st Trig", "2nd Trig", "3rd Trig", "4th Trig" . . . "10th Trig"), which activates conversion of converters ADC1 and ADC2, including data acquisition (herein "sampling") and data conversion (herein "conversion"). In the considered example, conversion is carried out by means of a channel of the injected group and thus, after each conversion, an end of conversion signal JEOC is generated.

In the embodiment shown, an external trigger TR event is not considered if both the ADCs are already carrying out a conversion. In this case, the trigger TR event is lost and the subsequent trigger event always activates the conversion of the first converter ADC1. For example, the "3rd Trig" and "8th Trig" signals do not cause an activation of one of the two converted ones, in that both converters are already performing conversions.

Figure 7:
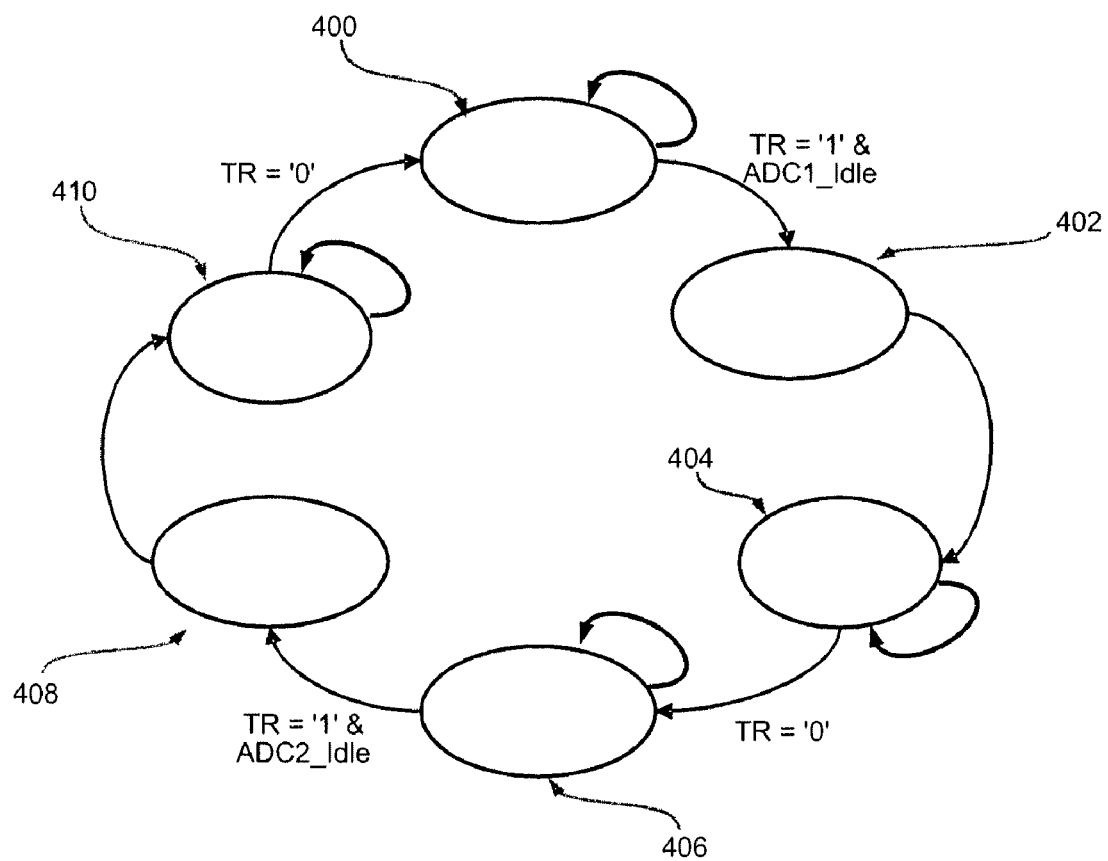

FIG. 7 is a state diagram of a possible embodiment of the synchronisation module 12.

Starting from an initial state 400, the module 12 waits until the arrival of an external event TR and checks whether the first converter ADC1 is available for a conversion (i.e. ADC1_Idle). For example, in case of an activation with the rising edge of the trigger TR signal, the trigger event may be checked by verifying the condition TR='1'. When both the conditions are met, the module 12 evolves towards a state 402.

In state 402 the conversion of the first converter ADC1 (for example through a pulse with level logic '1' for 1 clock cycle) is activated and the module 12 evolves towards the subsequent state 404.

The module 12 remains in condition 404 until the external event is deactivated, before evolving towards a state 406. For example, in case of an activation by means of a rising edge of the signal TR, deactivation of the external event may be checked by verifying the condition TR='0'.

The module 12 remains in condition 406 until the subsequent triggering event arrives. When such event occurs, the module 12 checks whether the second converter ADC2 is available for a conversion (i.e., ADC2_Idle). Once again, in case of an activation of the conversion by means of a rising edge of the signal TR, the event may be checked by verifying the condition TR='1'. If both conditions are met, the module 12 evolves towards a state 408.

In state 408 the conversion of the second converter ADC2 is activated and the module 12 evolves towards the next state 410.

The module 12 remains in state 410 until the triggering event is deactivated, before evolving towards the initial state 400. Once again, in case of activation by means of a rising edge of the signal TR, the deactivation of the triggering event may be checked by verifying the condition TR='0'.

Without prejudice to the underlying principle of the invention, the details and embodiments may vary, even significantly, with respect to what has been described herein by way of non-limiting example only, without departing from the scope of the invention as defined by the attached claims.

The invention claimed is:

1. An analog-to-digital converter ("ADC") for converting an analog signal into a digital signal, comprising:
a regular register configured to store a first conversion result of a first group of channels;
an injected register configured to store a second conversion result of a second group of channels; and
a memory buffer configured to receive the first conversion result and transfer to a memory via direct memory access each channels of the first conversion result and receive the second conversion result and transfer to the memory via direct memory access each channels of the second conversion result.

2. The ADC of claim 1, wherein the second group of channels is smaller than the first group of channels.

3. The ADC of claim 1, wherein the regular and the injected registers comprise bits specifying the number of channels to be converted.

4. The ADC of claim 1, wherein the memory buffer is configured to receive a maximum number of channels of the first conversion result.

5. The ADC of claim 1, wherein the ADC is configured to convert a number of channels equal to the first and second group of channels.

6. The ADC of claim 1, wherein a conversion generating the second conversion result starts after a triggering event.

7. The ADC of claim 6, wherein the triggering event is an external trigger.

8. The ADC of claim 7, wherein the trigger further interrupts a conversion generating the first conversion result.

9. The ADC of claim 6, wherein the triggering event is when a conversion generating the first conversion result terminates.

10. The ADC of claim 1, further comprising a control module configured to detect an activation of conversion of the first group of channels, and if detected, to select sequentially the channels of the first group and activate conversion of the channel currently selected.

11. The ADC of claim 1, further comprising a control module configured to detect an activation of conversion of the second group of channels, and if detected, to select sequentially the channels of said second group and activate conversion of the channel currently selected.

12. The ADC of claim 11, wherein the control module is configured to detect the presence of an automatic activation signal and, in the presence of the automatic activation signal, to automatically activate conversion of the second group when conversion of the first group has terminated.

13. The ADC of claim 10, further comprising a multiplexer controlled by the control module configured to select a channel among the channels of the first or second group.

14. The ADC of claim 11, further comprising a multiplexer controlled by the control module configured to select a channel among the channels of the first or the second group.

15. An analog-to-digital conversion system comprising:
the ADC of claim 1; and
a synchronization module configured to detect at least one trigger signals and activate sequentially a plurality of conversions in the ADC as a function of the trigger signals.

16. The system of claim 15, wherein the trigger signals are at least one status signal indicating of the availability of the ADC for executing a conversion.

17. A method for converting an analog signal into a digital signal, comprising:
converting a first group of channels and storing a first conversion result of the first group of channels in a regular register;
transferring the first conversion result of the first group of channels in a data buffer;
converting a second group of channels and storing a second conversion result of the second group of channels in an injected register;
transferring the first conversion result to a memory via direct memory access of each channel of the first conversion result from the data buffer; and
transferring the second conversion result of the second group of channels in the data buffer.

18. The method of claim 17, wherein the second group of channels is smaller than the first group of channels.

19. An analog-to-digital converter ("ADC") for converting an analog signal into a digital signal, comprising:
a control module;
a regular register configured to store a first conversion result of a first group of channels;
an injected register storing a second conversion result of a second group of channels;
a first multiplexer coupled to the control module and the registers configured to select and transfer a conversion result from the registers;
a memory buffer coupled to the first multiplexer configured to receive the conversion result transferred by the multiplexer;
a second multiplexer coupled to the control module and the memory buffer configured to select and transfer a channel in the conversion result in the memory buffer; and
a memory coupled to the control module and the second multiplexer configured to receive the channel transferred by the second multiplexer.

20. The ADC of claim 19, further comprising:
a synchronization module configured to detect at least one trigger signals and activate sequentially a plurality of conversions in the ADC as a function of the trigger signals.

* * * * *